United States Patent [19]

Norton

[11] 4,241,520

[45] Dec. 30, 1980

[54] COLOR CALCULATOR

[76] Inventor: Thomas K. Norton, c/o Tom Norton Designs, P.O. Box 29, Cambridge, Mass. 02139

[21] Appl. No.: 17,403

[22] Filed: Mar. 5, 1979

[51] Int. Cl.$^3$ .............................................. B44D 2/00
[52] U.S. Cl. .................................................. 434/102
[58] Field of Search ............... 35/28.3, 28.5; 356/422, 356/423, 424

[56] References Cited

U.S. PATENT DOCUMENTS

| | | | |
|---|---|---|---|
| 1,709,975 | 4/1929 | Foshay | 35/28.3 |
| 2,240,053 | 4/1941 | Richardson | 35/28.3 X |
| 3,229,385 | 1/1966 | De Pauw | 35/28.3 |

Primary Examiner—Harland S. Skogquist
Attorney, Agent, or Firm—Jerry Cohen

[57] ABSTRACT

Color wheel comprising 3 transparent overlaid discs with circumferential arrays of primary color gradation on each such disc, the colors being overlappable when the discs are moved relative to each other to define thousands of combinations and arranged so that in primary positions of the three discs, which are transparent, the color wheel forms perfect complements, triads, quartets, sextets, etc. and in almost all relative positions perfect and equal increments of analogous gradations of different color schemes (at all arcs where colors are changing). In each disc there is a 240-degree sweep of each primary color comprising a central 120 degrees of 100% intensity of the primary color decreasing in each 60-degree band of the side of the central 120-degree bands from 100% to 0 intensity at the outer edges of the 240-degree band. When the three such primary bands are aligned, they appear black through the combination of such colors where the said primaries are the primaries of the subtractive color system applied by inks or other mineral coatings, pigment impregnation or the like.

12 Claims, 5 Drawing Figures

COLOR CALCULATOR

BACKGROUND OF THE INVENTION

The present invention relates to color calculators usable in graphic arts trades, fashion, publishing, educational and other applications. Color charts or harmonizers have been known for over a century in one or more of the above applications and are described for instance in U.S. Pat. Nos.: 513,399 (Kreutzer); 2,196,397 (McDonald); 901,655 (Simpkin); 3,088,227 (Tudor); 1,041,765 (Fors); 3,229,385 (DePauw); 1,529,125 (Goodwin); 3,267,589 (Stanish)

There are a variety of calculating devices in the art, commercially used, including for instance the GATF Color Communicator comprising calibrated linear half tone wedges of primary colors (cyan, magenta, yellow in the subtractive system) and with black being an optional additional in such prior art device (as in the present invention).

It is an important object of this invention to provide a color calculator which calculates, in full color, color relationships with ease of use and with low cost to make, providing perfect complements, triads, quartets, etc. and perfect analogous gradations—generating mixtures of color in relationships including analogous gradations in all mixtures.

SUMMARY OF THE INVENTION

In accordance with the invention there are provided three transparent, overlapping discs on a common center or equivalent of such construction—e.g. loops or belts around a cylinder or cone and with obvious variations such as endless eliptical or even rectangular paths instead of circular as would be the case for discs or cylindrical loops. References to discs herein shall be understood to import the analogous configurations of such alternates and variations.

Each of the transparent discs has transparent colors imparted thereto by such means as dye impregnation of ink, or percentage dot-screen reproduction of a transparency, or other coating applications. In each case the transparency is preserved even in the nominal 100% (or less) saturation color applied areas, i.e. where the color is applied by a matrix printing or the like to appear to a human have to be full intensity and full coverage of a section. A nearly continuous array of primary color is provided along the circumferential path in each such disc, all on the same radius so that the colors will overlap. Each disc is assigned a primary color—cyan, yellow, magenta in the subtractive system applicable to inks, dyes and the like (in contrast to systems where red, blue and green light form white light).

The color in each primary on each disc is spread over an arc of 240 degrees, at 100% intensity in a 120-degree arc in the center of the 240 degree arc with 100% to 0 declination of intensity in equal steps over the 60% on each side of the central 120 degrees arc within the 240 degree arc. While it is possible to have an unbroken stripe of continuous declination it is preferred to have spaced patches, each such patch at a given intensity for greater practical use in graphic arts industries and the like. The gradations are preferably at 10% apart to meet practical construction conditions although higher and lower rates of gradations can be utilized. The rate of gradation in relation to arc distance is preferably along a 45-degree linear rate although other linear rates can be utilized, it being essentially impractical for most purposes (although not all) to use nonlinear relationships in the rate of gradation.

There also is a mark on each transparent disc to show the center (or the 120-degree band of 100% intensity) and for other useful purposes (e.g. dividing each disc up into 30-degree and/or 60-degree pie segments).

When the 100% lines of the yellow, magenta and cyan discs are aligned, all patches of color appear black because of the subtractive effect of the three primaries, all natural combinations of the primaries and low intensity (than 100%) variations that can be made, as the three discs are relatively moved by pivoting about the common center to form analogous step gradations of the synthesized colors made from various mixtures of the primaries, forming in each such case, perfect complements (those patches being 180° from each other).

It is well known that when such perfect complements, triads, quartets, etc. are formed there are strong physiological and psychological reactions to the color schemes and, to a lesser extent, strong aversions to color schemes when proper geometric matches are not obtained. The calculator of the present invention affords reliable matching and virtually all combinations permitted, depending on degree of gradation of the 0 to 100% variation in intensity for each primary color.

These and other objects and advantages of the invention will be apparent from the following detailed description of preferred embodiments thereof taken in connection with the accompanying drawing, in which,

DETAILED DESCRIPTION OF PREFERRED EMBODIMENTS

Figure 1:
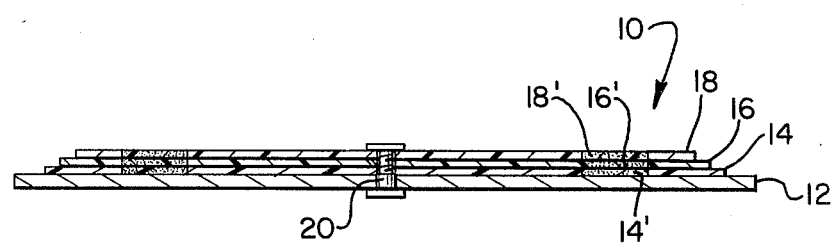
FIG. 1 is a cross-sectional view of an embodiment of the color calculator invention comprising a backing and three transparent discs as described above.

FIG. 1 shows the color calculator according to a preferred embodiment of the invention as 10 as comprising a backing panel 12 of white, cardboard, paper, plastic or the like and mounting three transparent discs 14, 16 and 18 fixed about a common pivot 20 which is anchored to the backing 12. Color patches are contained in circumferential array of the same rate of distance from the center 12 in regions 14', 16' and 18' of the discs, 14, 16 and 18, respectively. Such color patches may be surface layers on the disc, applied by ink, painting or the like or by dye impregnation into such regions of the discs, preserving the character of the transparency through a dot screen (or the dilution of dye impregnating solutions or the like).

Each disc has a primary color spread over its circumference typically yellow for the color patches 18' of disc 18, magenta for color patches 16' of disc 16, and cyan for color patch 14' and disc 14, although the arrangement from top to bottom is not critical.

Figure 2:
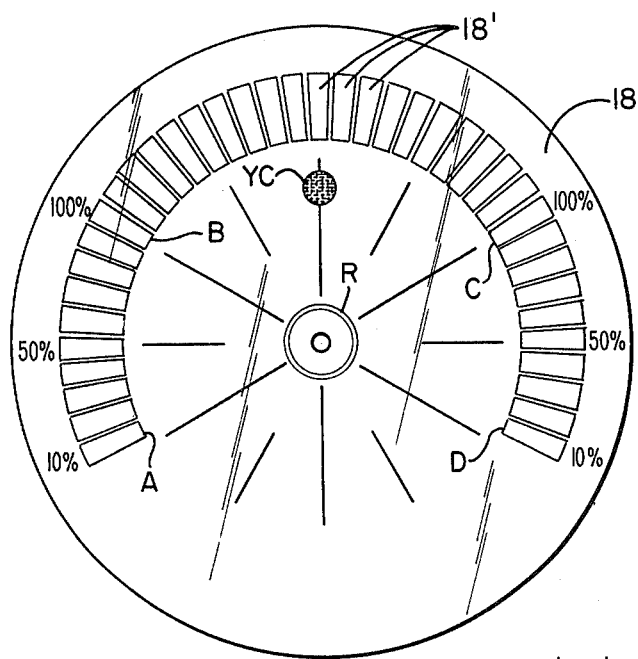
FIG. 2 is a plan view of a typical line of such discs.

Referring to FIG. 2, plan view of disc 18, the patches 18' are seen to be spread in an array of 10–100% intensity in a region of 60° from a point A to a point B. In the central region of this 240° arc, there is a 120° arc point B-C entirely of 100% intensity of the yellow, while the 60° region C-D has descreasing increments of yellow intensity going from 100% to 10%. A line YC is provided in 18 to indicate the center of the 120° 100% yellow intensity, i.e., yellow center.

Figure 3:
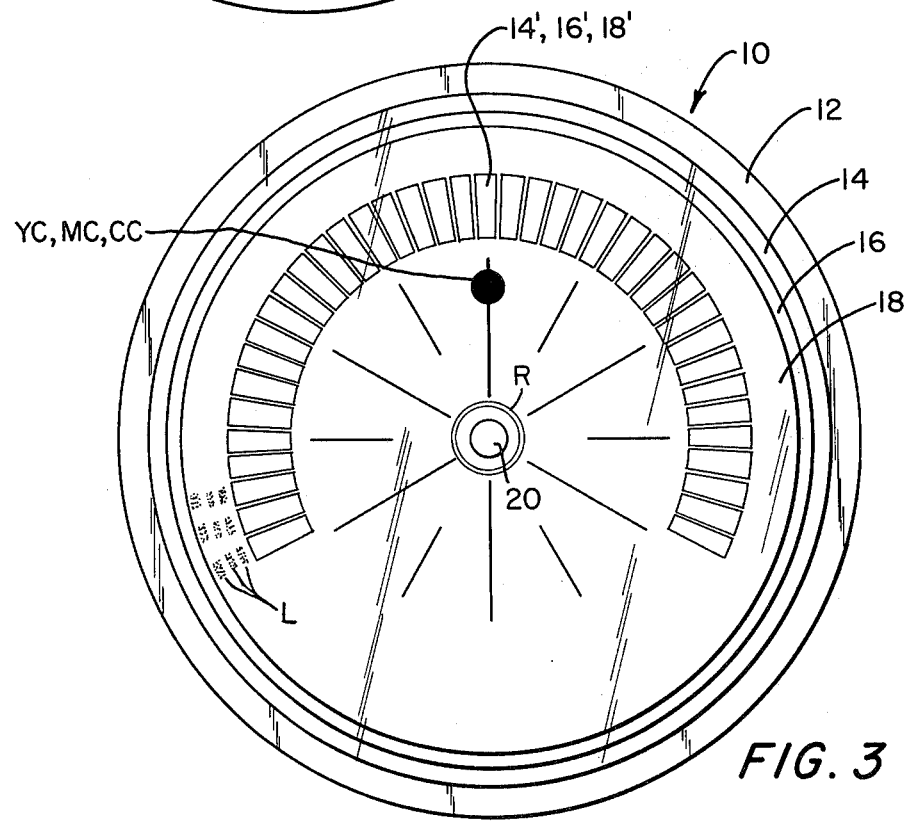

FIG. 3 shows the three discs 14, 16, 18 overlapped as it would be in the device 10 as shown in FIG. 1 with their centers YC/MC/CC—yellow center, magenta center, cyan center, aligned so that the overlapping color patches 14'/16'/18' all appear black or imperfect black depending on the imperfection of the particular form of primary colors utilized in the respective discs. The black thus obtained has a central 120° region of 100% intensity and a 60° region on each side of the central 120° region of graded black for 100% down to 0 going away from the central 120° region of true black intensity with the remaining 120° region bottom of FIG. 3 showing being blank in the three transparent discs so aligned.

Figure 4:
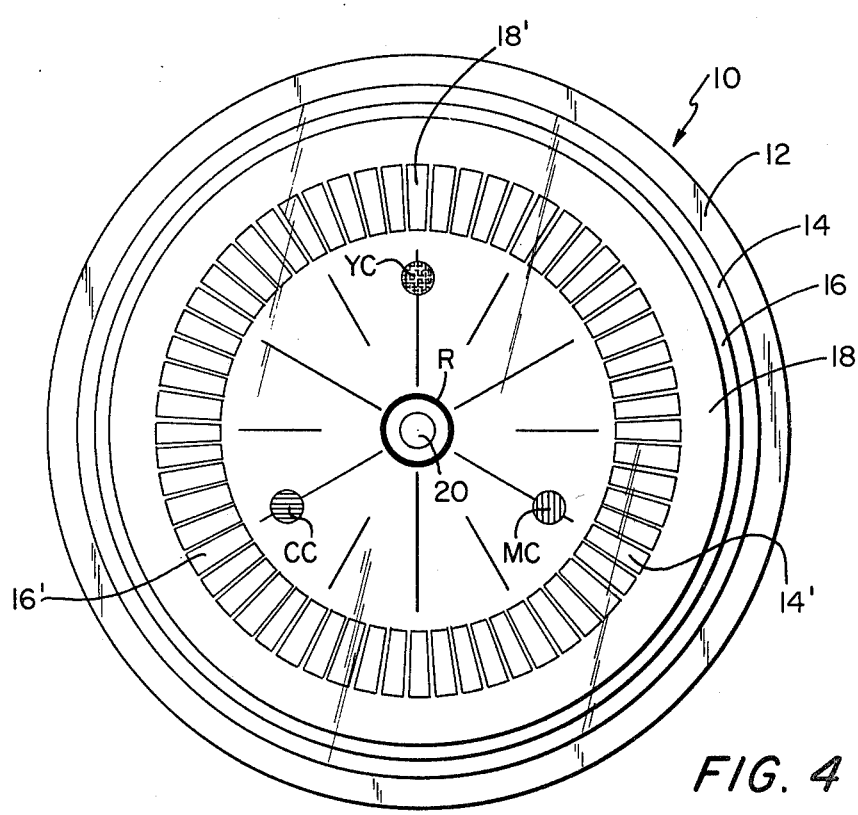
FIGS. 3, 4 and 5 are top views of a device with the overlapped discs being arranged in various combinations to illustrate application of the invention, FIG. 5 showing a variant where a black overlay strip is optionally used, e.g. for four color applications.

FIG. 4 shows another position of the overlapping transparent discs 14/16/18 after relative rotation thereof so that the yellow, magenta and cyan centers are 120 degrees apart, thereby producing complete spectra in the overlapping patches 14', 16', 18' around the disc. To the extent that incomplete alignment of the patches 14'/16'/18' is made interesting decorative effects are produced, but are not part of the color calculation which depends on substantially complete alignment of the various patches of color. However for some graphic purposes, useful local spectra will be produced at these areas of imperfect overlap, as a collateral benefit of the present invention.

Figure 5:
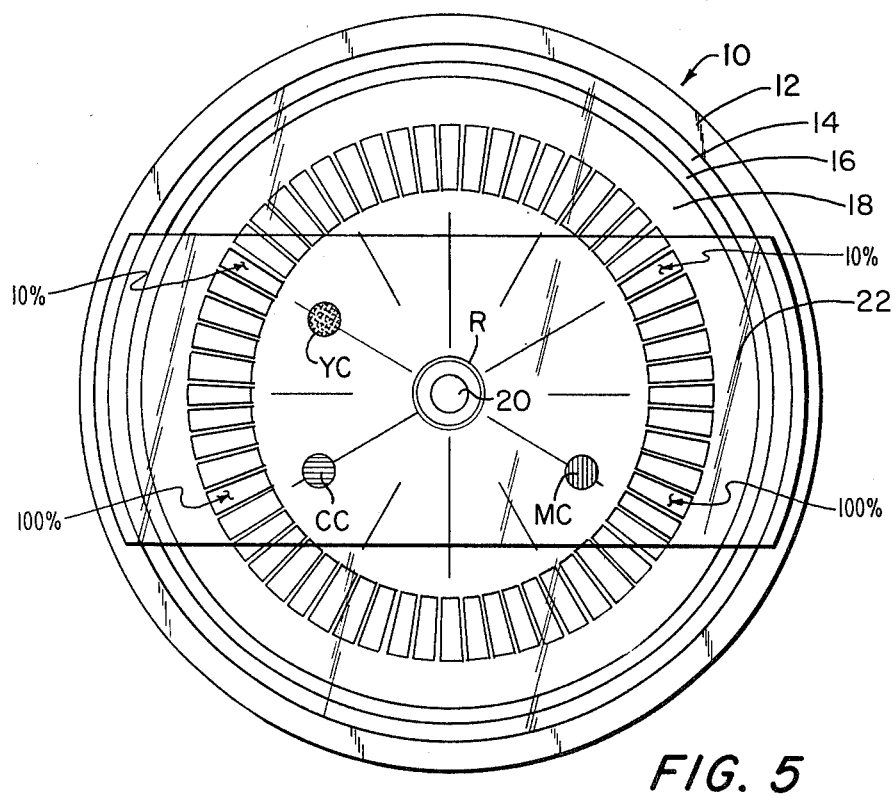

FIG. 5 shows a typical color calculating position between the extremes of the FIG. 3, all black, and FIG. 4 natural spectrum positions used in a typical case producing a whole array of synthesized color combinations in the overlapping patches 14', 16', 18' around the circumference of the wheel. All such combinations for that particular position of the discs 14, 16 and 18 are in perfect complement array, (those patches which are 180° from each other) and will be so in yet other relative positions of the three discs. In the FIG. 4 position, perfect triads, sextets, etc. will also be formed. Additionally, it is shown in FIG. 5 that a diametral patch of a screen 22 may be provided which will be of particular use in printing and painting industrial arts, but also other arts for visualizing the effect of various black screen intensities and/or tints to be utilized with any such synthesized colors.

The diametral patch 22 has color swatches, to overlay those of discs 14–18, wherein the colors thereof are black or white (the latter being a hiding pigment rather than a true color) in 10–100% graded intensities in increments of 10% from one swatch to the next, as follows:

| Black | White |
| --- | --- |
| 100% at top left and top right decrementing down to 10% at bottom left and bottom right of patch 22. | 10% at top left and top right incrementing up to 100% at bottom left and bottom right of patch 22 as shown in FIG. 5. |

The black patch 22 would have visible numerical indicia of % intensity, next to corresponding swatches, and the white patch would not. White and/or black patches are optional additions to the basic calculator usable separately or together with each other.

Because the gradations of the black overlay patch are arranged in the same fashion as the 14–18 discs, one will still be able to calculate color complements, and the step gradations will remain the same within the black overlay patch to provide a percentage tint at total color, the white overlap would be used. (This is similar to looking at only the magenta film for example and seeing the gradation of magenta from 100% to 10%—but with the variation of mixing a color, such as with 100% yellow, 60% magenta, 10% cyan, with 100% of that, or 90% of that, or 80% of that, or 70% of that, or 60% of that, or 50% of that, or 40% of that, or 30% of that, or 20% of that, of 10% of that. This is made possible by the film patch with white pigmentation instead of yellow, magenta, cyan or black.

The percentages are reversed in order, because instead of its color combining with the colors underneath, the white would be masking out the colors underneath. With this overlay in place, then, the colors at the top would appear at fullest saturation, and at the bottom less saturated (because they would be almost completely covered with white).

Also, there may be an opaque white band on the outside edge at the color swatches that would mask out all the numerical indications of percentages of underlaying discs. This would be because the white film would be only for the purpose of seeing an approximation of the tint of a particular color; it does not break down in 10% intervals "mixing" color with 100% of the yellow, magenta and cyan. (It can be done mathematically but not at 10% intervals of yellow, magenta and cyan as in the rest of the wheel, e.g. for specification to a printer.) With the basic wheel, one is able to specify the proportions of yellow, magenta and cyan that make up that color, so that that color could be produced on a printed print by combining those percentages of inks over each other. With the white overlay in place, the yellow, magenta and cyan percentages are of no consequence. It then must be thought of as if the colors mixed are the actual color of a mixed ink (orange ink, brown ink, etc.) that is then broken down into percent gradations.

In a variant of the above described preferred embodiment of the invention, mentioned above, color gradients from 0 to 100% or 100% to 0, may be in other than 45° linear relationship. Similarly the 60° arc assigned to such gradation series may be expanded or contracted (as may the central 120° region of 100% color) on each disc.

It is particularly desirable to provide in connection with each of discs 14, 16 and 18, numerical indications of color intensity of color swatches 14', 16', 18' therein at 100% or between 0 and 100%. The numerical indications on each disc should be aligned so that they are not superposed from disc to disc so that they do not blur each other. Then when the device is asked to calculate the effect of different color combinations, the resultant numerical mix of any superposed color swatch combination can be read out numerically for technical (e.g. printing, photography) or decorative (e.g. fabric selection) planning or process implementing use.

A user of the device can derive complements and analogous step gradations for thousands of permutations and rapidly test many such permutations in a natural way by manipulating colors directly and then finally read out the primary color intensity components of a selected mixed color.

The optional black disk when used can have 10 graded swatches (10% black to 100% black) on each side and similar numerical indications thereof. Although substantially all colors can be obtained by mixtures of yellow, magenta and cyan alone, traditional printing industry practice has included use of black (i.e. for color printing). When the black disk is used, perfect complements and analogous step gradations are still obtained in substantially all positions.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Color calculator comprising
means defining at least three endless continuous loops of transparent material relatively movable through 360° cycles in overlapping fashion,
each such loop comprising in a minor area thereof, an array of color gradations in a primary color of the system as follows:
0 to 100% over 60°, then 100% over 120°, then 100% to 0 over 60°, balance blank, the 0 to 100% and 100% to 0 gradations being at substantially linear rate—i.e., equal (or other defined linear relation) increase (or decrease) in intensity per circumferential distance increment,
means for indicating the center of each such primary color array on its respective loop,
whereby (a) aligning the three centers 120° apart and in correct order produces secondary colors between the primaries, made of overlapping colors of the primary graded colors and incremental combinations therebetween, (b) overlapping the three centers produces a 240° arc of the combination of the three primaries (black in subtractive color primary system) of 100% intensity over a 120° central portion and 60° 0–100% to 0 at sides of the arc and 120° blank, and (c) other overlap combinations produce thousands of mixed colors which in all such arrangements show perfect complements, and perfect analogous step gradations around the loops, all the gradations of synthesized colors having natural gradation relationship.

2. Color calculator in accordance with claim 1 wherein the loops are flat discs, overlapping and having a common center of rotation, each containing color patches in circumferential array and at the same radial distance from the common center with complements thereby formed at diametrical opposites only.

3. Color calculator in accordance with claim 2 and further comprising 60° spaced indicia as radial lines on each disc in the primary color of that disc.

4. Color calculator in accordance with any of claims 1, 2 or 3 wherein the primary colors are made of dye impregnants in the respective loops, the primaries being cyan, magenta and yellow.

5. Color calculator in accordance with any of claims 1, 2 or 3 wherein the primary colors are made of pigment coloring on the respective loops, the primaries being cyan, magenta and yellow.

6. Color calculator in accordance with any of claims 1, 2 or 3 wherein the color gradations of each series are in distinct steps with separation between patches, continuing such steps of color (in the 100% region as well as the 0–100 and 100–0 regions).

7. Color calculator in accordance with claim 6 wherein the steps are 10% in each of the 0 to 100 and 100 to 0 regions of each primary color continuum.

8. Calculator device for calculation of, and education in, color relationships, comprising,
means defining at least three endless continuous loops of transparent material relatively movable through 360° cycles in overlapping fashion,
each such loop comprising an array of color gradations in a primary color of the system as follows:
0 to 100% over 60°, then 100% over 120°, then 100% to 0 over 60°, balance blank, the 0 to 100% and 100% to 0 gradations being at substantially linear rate—i.e. equal (or other defined linear relation) increase (or decrease) in intensity per circumferential distance increment,
means for indicating the center of each such primary color array on its respective loop,
whereby (a) aligning the three centers 120° apart and in correct order produces secondary colors between the primaries, made of overlapping colors of the primary graded colors and incremental combinations there between, (b) overlapping the three centers produces a 240° arc of the combination of the three primaries (black in subtractive color primary system) of 100% intensity over a 120° central portion and 60° 0–100% to 0 at sides of the arc and 120° blank, and (c) other overlap combinations produce thousands of mixed colors which in all such arrangements show perfect complements, and perfect analogous step gradations around the loops, all the gradations of synthesized colors having natural gradation relationship,
the structural implementation of the foregoing means comprising,
means defining at least three overlying transparent plates of endless form movable in repeat cyclic fashion, each such plate having a series of transparent color swatches therein,
the color swatches of each plate being semi-transparent shades of a primary color, a different primary color being assigned to each such plate,
the color swatches being arranged to provide overlaps of the swatches from plate to plate in different combinations of shades of the respective primaries including perfect complements and perfect analogous step gradations.

9. Color calculator in accordance with claim 8 wherein the primary colors are made of dye impregnants in the respective discs, the primaries being cyan, magenta and yellow.

10. Color calculator in accordance with claim 8 wherein the primary colors are made of pigment coloring on the respective discs, the primaries being cyan, magenta and yellow.

11. Color calculator in accordance with claim 8 wherein the color gradations of each series are in distinct steps with separation between patches, continuing such steps of color (in the 100% region as well as the 0–100 and 100–0 regions).

12. Calculator device in accordance with either of claims 1 or 8 and further comprising numerical indicating means showing the color intensity of each superposed color swatch for each of many combinations of such superposed color swatches.

* * * * *